May 1, 1962 J. KNOX-SEITH 3,032,725
PULSE TRANSMISSION
Filed Sept. 17, 1959

FILTER "A" CHARACTERISTIC

FILTER "B" CHARACTERISTIC

INVENTOR
J. KNOX-SEITH
BY J. P. Kearns, Jr.
ATTORNEY

United States Patent Office 3,032,725

Patented May 1, 1962

3,032,725

PULSE TRANSMISSION

John Knox-Seith, East Orange, N.J., assignor to Bell Telephone Laboratories, Incorporated, New York, N.Y., a corporation of New York Filed Sept. 17, 1959, Ser. No. 840,654
3 Claims. (Cl. 333—20)

This invention relates generally to the transmission of digital data electrical signals and more specifically to an arrangement for the reduction of the effect of impulse noise on the transmission of such signals.

One of the most vexing problems in the transmission of serial digital data signals over telephone circuits at speeds of the order of 1,000 data bits per second and higher is that of overcoming the effect of impulse noise on the individual signal bits. The signal-to-noise ratio on most present-day telephone circuits with respect to white noise is so great that errors in reception are rarely attributable to the presence of such noise. However, impulse noise consistng of short duration but high amplitude spikes believed to be generated mainly in automatic switching offices may have a power content considerably greater than any individual signal bit. The power level of these noise impulses is such that it is impracticable to overcome their effects by increasing the signal transmission level. In the transmission of voice signals over telephone circuits the presence of impulse noise has not given any great concern because of the integrating effect of the ear over periods of time in the order of hundreds of milliseconds. In digital data signals, however, each bit of information may occupy a much shorter time interval, that is, in the case of a 1,000 bit-per-second digital data transmission system each bit will occupy but one millisecond, and each individual signal bit may contain less power than a noise impulse. Single data bits are therefore readily susceptible to obliteration by impulse noise spikes.

It is the principal object of this invention to reduce the effect of impulse noise in switched digital data transmission systems.

It is another object of this invention to reduce the error rate in digital data transmission systems subject to impulse noise.

It is still another object of this invention to reduce the error rate in digital data transmission systems without reducing the speed of transmission and without increasing the bandwidth of the transmission medium.

According to this invention, a serial digital data signal prior to transmission over a telephone circuit is predistorted by an all-pass linear delay filter which in the band of interest has a constant amplitude-frequency characteristic and an increasing delay-frequency characteristic. Prior to detection at the end of the telephone circuit the data signal is restored by a further all-pass linear delay filter which in the band of interest has a constant amplitude-frequency characteristic and a decreasing delay-frequency characteristic complementary to the characteristic of the first-mentioned filter. In passing through the two complementary filters the data signal is delayed, but it is otherwise unaffected, whereas the impulse noise assumed to arise on the telephone line, particularly at central office switching points located between the filters, passes through one filter only. Since the impulse noise power is distributed over the total band of interest it will be dispersed in time by the filter over a plurality of data signal bits so that all signal bits are at a detectable level above the noise. Therefore, no individual signal bit is obliterated. An advantage of this technique, contrary to other known techniques for reducing the error rate, such as by a parity checking or signal encoding, is that the speed of signaling is unaffected by the presence of the filters.

Other objects and advantages of the invention will be apparent from the following detailed description and the appended claims taken in connection with the accompanying drawing, in which:

Figure 1:
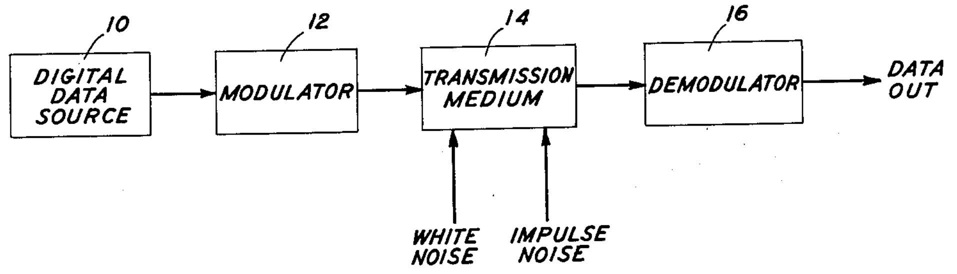
FIG. 1 illustrates in block diagrammatic form a typical digital data transmission system.

Referring now to FIG. 1, a typical digital data transmission system is seen to comprise a data source 10 and modulator 12 at the transmitting end; a transmission medium 14, which may be a telephone line; and a demodulator 16 at the receiving end. Modulator 12 may be of any type—amplitude, frequency or phase modulator—suitable for transforming the raw data from digital source 10 into a form which can be handled by the transmission medium 14. Modulator 12 is most likely located at the sending customer's premises.

On the transmission medium 14 there is indicated by arrowheads the introduction of two types of noise. The white noise indicated by the left arrowhead has a uniform power distribution over the band of interest, is random in nature, and the instantaneous amplitude is normally distributed. For the purposes of this description it may be assumed that the average power of the input signal applied to the medium 14 from modulator 12 is sufficiently greater than the average power of the white noise to assure that very rarely will the white noise be able to obliterate the signal. Therefore, white noise is of no immediate concern.

The impulse noise indicated by the right arrowhead is of a different character. This noise comprises relatively infrequently occurring pulses of high amplitude and of very short duration, and is believed to be due mainly to switching transients in the telephone system. Any switching paths in the telephone circuit are assumed to be included in transmission medium 14. However, the restricted bandwidth of the transmission medium tends to cause the spreading out of the impulse to the order of a millisecond in the case of a telephone line. Due to the very short duration of such noise impulses the power spectrum encompasses the entire frequency spectrum of the transmission medium.

Demodulator 16 recovers the transmitted signal from the output of the transmission medium in the usual manner and its construction, of course, depends on the type of modulation employed at the transmitting end of the transmission medium. The demodulator, in the data case, considers the incoming signal over the period of one bit length at a time and from this determines the digital information carried by the signal. In the case of a 1,000 bit-per-second transmission system, the demodulator considers one millisecond of the signal at a time. Demodulator 16 is most commonly located at the receiving customer's premises.

Figure 2:
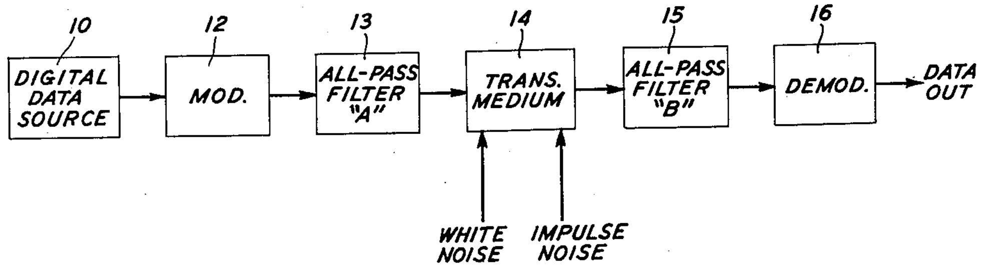
FIG. 2 illustrates the modification of the digital data system in accordance with this invention.
Figure 3A:
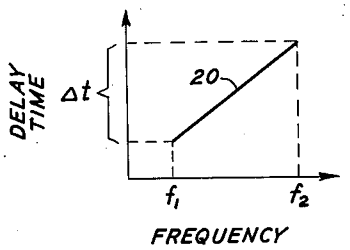
FIGS. 3A and 3B illustrate the delay-frequency characteristics of complementary all-pass filters usable in the practice of this invention.
Figure 3B:
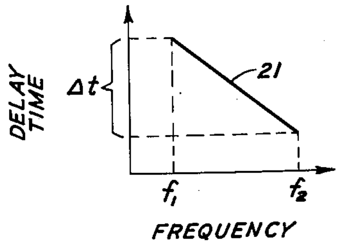

FIG. 2 shows the data transmission system of FIG. 1 improved by the insertion of matched complementary all-pass filters A and B, designated by numerals 13 and 15, respectively. Elements in FIG. 2 of a nature similar to the corresponding elements in FIG. 1 are similarly designated. Each of the filters A and B, for which typical delay-frequency characteristics are shown as curves 20 and 21 in FIGS. 3A and 3B, respectively, has in the transmission band of the medium 14 a linear delay (ordinate in FIGS. 3A and 3B) versus frequency (abscissa in FIGS. 3A and 3B) characteristic and an amplitude gain of unity. Filters of this type are well known in the art. For example, a recent report by D. W. Lytle entitled "On the Properties of Matched Filters," published by Stanford Electronics Laboratories of Stanford, California, on June 10, 1957, outlines the design principles of such filters in chapter VI thereof in such fashion as to enable one skilled in the art to construct a filter with the desired properties.

In the practice of this invention in connection with a 1,000 bit-per-second data transmission system using ordinary telephone circuits as a transmission medium, a set of filters with a passband of approximately 500 to 2,500 cycles per second, and a delay time differential $\Delta t$ of 5 to 10 milliseconds is contemplated.

The effect of introducing filters A and B at opposite ends of the transmission medium is to delay the signal that passes through both by the combined delay time of the individual filters without otherwise changing the signal. This combined delay time is evidently constant for all frequencies within the band of interest. White noise, which is generated on the transmission medium, passes through filter B only, but still retains the nature of white noise at the demodulator, since only the phase relation between the various frequency components are altered and not their randomness.

Impulse noise, however, experiences a significant change in passing through filter B only. A noise impulse which has its power on the line concentrated in a time interval shorter than the length of a signal bit, has at the output of filter B its power spread out over a time interval approximately equal to the delay time differential $\Delta t$ of filter B, since the noise impulse contains significant power in the total frequency band of interest. By making the delay time differential $\Delta t$ in filters A and B equal to the length of several signal bits, the noise impulse which originally had its power concentrated in the time interval of one or two signal bits will be smeared over several signal bits and the noise power which tends to destroy the individual signal bits will therefore be reduced significantly. It is seen that as $\Delta t$ is increased the effect of the impulse noise on the individual bits is still further reduced. For a practical system the ratio between the impulse noise power and the signal power in a single bit determines the necessary delay time differential $\Delta t$ to be used in filters A and B.

Referring again to FIG. 2, it is seen that a signal bit which is assumed to contain significant power over the total bandwidth of the transmission medium, in passing through filter A has its power dispersed over a time interval corresponding to the delay difference $\Delta t$ found in filter A. Since filter A has a delay difference of several bit lengths, succeeding bits are spread out or smeared into overlapping relationship with each other so that at any given time a number of different signal bits are in the process of being transmitted over the transmission medium. If now a noise impulse of short duration is generated on the transmission medium, it affects several signal bits. The power ratio between the signal bits and the impulse noise for these bits is then greater than would be the case in the same transmission system without using the filters where only one or two signal bits are affected by the noise impulse.

At filter B, having numerically the same delay time differential $\Delta t$ as filter A, the smeared or slurred signal bits are separated by virtue of the fact that the high-frequency components delayed the most in filter A are now delayed the least in the complementary filter B. The individual signal bits are thereby contracted and are restored to a state in which they may be separately detected. The power in the noise impulse which was originally concentrated in the time of about one signal bit is now dispersed over several signal bits because the noise has passed through filter B. The effect of the impulse noise on each signal bit is therefore significantly reduced.

In an experimental demonstration of the method of this invention a set of filters having a delay differential $\Delta t$ of 3 milliseconds was used in connection with 1,000 bit-per-second data transmission in which the signal was impaired by impulse noise. An improvement of 4 to 6 decibels in equivalent signal-to-noise ratio was obtained by the introduction of these filters. The effect of the use of filters having a greater delay time than 3 milliseconds would affect a correspondingly greater improvement in the equivalent signal-to-noise ratio.

It should now be apparent to one skilled in the art that the dispersive networks constituted of filters A and B can be interchanged without affecting the overall result. The arrangement of filters described above is purely by way of illustration of the method of this invention. It should further be apparent that the delay in filters A and B need not necessarily vary linearly with frequency. It is only necessary that the predistortion introduced in filter A at the transmitting end of the system be undone at the receiving end by passing the predistorted signal through a compensating filter B having an inverse or complementary characteristic. In a practical transmission system it may be found that there is enough inherent delay distortion in the transmission medium that filter B be designed, not as the exact complement of filter A, but as the complement or inverse of the delay distortion of filter A plus that inherent in the transmission medium. The inherent delay distortion in the transmission medium may also dictate whether a predistortion delay increasing with frequency is preferable in a given application over a predistortion delay decreasing with frequency. The method of this invention can be used not only on digital data transmission systems employing telephone circuits, but also on any digital data transmission system in which the major impairment of the signal is due to impulse noise.

What I claim as my invention is:

1. A system for transmitting digital data signals comprising a transmission medium subject to bursts of impulse noise, a source of discrete non-overlapping bits of data, transmission means for preparing said data for transmission comprising means for stretching the duration of each bit of said data over a plurality of data bit intervals, means for applying said stretched data to said medium and receiving means for recovering said data from said medium, said receiving means comprising a dispersive circuit for compressing the duration of said stretched data into the original data bit intervals and for dispersing the power in each burst of said impulse noise over a plurality of data bits.

2. In a pulse transmission system an arrangement for reducing the effect of impulse noise comprising a source of digital data signals, a first filter coupled to said source for differentially delaying frequency components in said signals in one direction with frequency so that successive signals emerge therefrom in overlapping relationship, a transmission medium for said overlapping signals which is subject to impulse noise, a second filter receiving overlapped signals from said transmission medium for differentially delaying frequency components in the received signals in a manner complementary to the delay in said first filter so that the received overlapping signals are separated and impulse noise is dispersed over a plurality of said signals, and a detector for said separated signals.

3. An arrangement for suppressing impulse noise in a digital data transmission system having an inherent delay distortion characteristic and subject to impulse noise comprising a first all-pass filter for delaying the frequency components in discrete data pulses according to a delay characteristic which increases with frequency so that said data pulses are brought into overlapping relationship, means for impressing the overlapped pulses on one end of said transmission system whereby said pulses are subjected to impulse noise and delay distortion, and a second all-pass filter for pulses received at the other end of said transmission system having a delay characteristic which is the inverse of the sum of said increasing frequency characteristic and said inherent delay distortion characteristic for separating the overlapped data pulses.

References Cited in the file of this patent

UNITED STATES PATENTS

| | | |
|---|---|---|
| 2,678,997 | Darlington | May 18, 1954 |
| 2,810,784 | Harris | Oct. 22, 1957 |